IUF-266 •
7/7/7

United States Patent [19]

Starbuck

[11] E Patent Number: Re. 32,454

[45] Reissued Date of Patent: Jul. 7, 1987

[54] PROCESS FOR DESULFURIZATION OF COAL AND ORES

[75] Inventor: Arthur E. Starbuck, Sparks, Nev.

[73] Assignees: Pure Fuel of Nevada, Inc.; Ag-Con Materials of Nevada, Inc., both of Reno, Nev.

[21] Appl. No.: 266,631

[22] Filed: May 26, 1981

Related U.S. Patent Documents

Reissue of:

[64] Patent No.: 4,213,793
Issued: Jul. 22, 1980
Appl. No.: 882,866
Filed: Mar. 2, 1978

[51] Int. Cl.[4] ..... C09K 3/00; C01B 17/08

[52] U.S. Cl. ..... 106/286.8; 23/293 S; 44/1 SR; 423/578 A

[58] Field of Search ..... 106/286.8; 423/578; 44/1 SR; 23/293 S

[56] References Cited

U.S. PATENT DOCUMENTS

| | | | |
|---|---|---|---|
| 1,963,921 | 6/1934 | Nagelvoort | 423/578 A |
| 2,785,059 | 3/1957 | McDonald | 423/578 A |
| 2,897,065 | 7/1959 | Capel et al. | 423/578 A |
| 3,063,817 | 11/1962 | Simpson | 423/578 |
| 3,535,089 | 10/1970 | Lewis et al. | 423/578 A |
| 3,607,143 | 9/1971 | Wierman et al. | 423/578 A |
| 3,997,355 | 12/1976 | Santucci et al. | 106/274 |
| 4,076,505 | 2/1978 | Dessau | 201/17 |

FOREIGN PATENT DOCUMENTS

| | | |
|---|---|---|
| 858056 | 1/1961 | United Kingdom . |
| 1274737 | 5/1972 | United Kingdom . |

*Primary Examiner*—Theodore Morris

[57] ABSTRACT

A continuous process of desulfurizing coal and other ores contaminated with sulfur and recovering the sulfur in relatively pure crystal form, the process for coal including the steps of crushing sulfur bearing coal ore, mixing the crushed ore in a solvent forming a solvent liquor in which the sulfur is dissolved, centrifuging the solvent liquor separating a coal slurry from the solvent liquor, centrifuging the coal slurry separating the coal from the tailings including rare metals for further refining to recover the rare metals, drying the coal slurry and recovering the solvent, filtering the remaining solvent liquor removing ash, crystallizing the sulfur in the filtered solvent, centrifugally separating the crystallized sulfur from the solvent and recovering the solvent, drying the crystallized sulfur and further recovering the solvent, heating the crystallized sulfur to form a sulfur liquid and casting the sulfur in preformed molds to produce building materials.

26 Claims, 4 Drawing Figures

SOLID TAILING
RESIDUALS FOR REFINING
ASH WASTE

PROCESS FOR DESULFURIZATION OF COAL AND ORES

Matter enclosed in heavy brackets [ ] appears in the original patent but forms no part of this reissue specification; matter printed in italics indicates the additions made by reissue.

BACKGROUND OF THE INVENTION

This invention relates to a process for desulfurization of ores, particularly coal, that is continuous and which recovers a high grade sulfur crystal.

A primary use of the process is for production of a sulfurless coal powder than can be fired in powder form, or further processed into briquettes by conventional means. The crystaline sulfur is suitable for general sulfur products or in continuous steps may be melted and cast into construction blocks. This process is adaptable to other ores for recovery of tungsten, cinabar, etc. which are relatively high in sulfur content.

The critical need and dependence on fossil fuels, particularly oil, has caused a reevaluation of fuel use priorities. It is requisite to examine the specific type of fuel to be consumed in each instance. Because oil and its refined products are a convenient source of power for vehicles, it is desirable to reserve the limited oil resources to such uses if it is to be used as a power source. Ideally oil should not be consumed as a power source but reserved for lubricants and other by-products such as solvents and plastics.

Natural gas similarly should not be used either as a power source or for heating. Because of its particularly clean burning, natural gas should be reserved for open flame uses such as cooking and other clean combustion applications.

Stationary power sources are ideally suited for burning of coal which is available in abundance in certain geographical areas and particularly throughout North America. However, much of the available coal is contaminated with sulfur, which generates a noxious pollutant when the coal is combusted. Expensive pollution control devices installed to wash the combustion gases are only partially successful in removing sulfur, sulfur compounds and oxidants before releasing such combustion gases to the atmosphere. Consequently, much of the coal mined that is not of low sulfur content or is otherwise highly contaminated with impurities is simply left in gob piles.

Ideally, the sulfur contaminant should be removed prior to combustion. Past processes are of limited efficiency and contribute excessively to the cost of coal as a common fuel.

The process devised is economical and is operable as a continuous rather than batch method. Furthermore, the process recovers and recycles the solvent used to separate sulfur from the ore maintaining solvent losses at a minimum. The large quantities of sulfur recovered are usable in a coupled process stage to produce building blocks at a cost competitive with similar concrete blocks. The process is particularly applicable to gob pile coal that has been abandoned and exists in huge quantities. Other features of this process are described in greater detail in the detailed description of the preferred embodiment hereinafter.

SUMMARY OF THE INVENTION

The desulfurization process of this invention is a continuous process for desulfurizing ores, particularly coal. The process recovers a high grade sulfur and extracts other solids which may be further refined for recovery of precious metals or by-products that are economically justifiable to recover. When used for desulfurization of coal, the principal application which is described herein in detail as an example of the process, the coal is refined to a high grade coal powder suitable for modern powder handling techniques which approximate the advantages of liquid handling.

The process begins by crushing the ore, a sulfur bearing coal ore in the preferred use, to approximately a 28 mesh size. The crushed ore is mixed with a solvent, preferably perchlorethylene, forming a solvent liquor in which the sulfur dissolves in solution. The solvent liquor is centrifuged separating the sulfur and solvent solution from the coal slurry in a continuous process centrifuging drum. A second centrifuging drum separates the lighter weight coal particles from the heavier earth tailings or sedimentary-type residuals in a continuous process.

It has been discovered that such residuals or tailings include a surprisingly high amount or rare metals, typical samples including close to one ounce of platinum, over a tenth of an ounce of gold and substantial traces of silver for each ton of coal ore. These elements can be profitably removed from the residual tailings by conventional refining. The separated coal is dried in a solvent recovery process and readied for use, shipment or further processing into briquettes.

The sulfur liquor, contaminated with a microparticle ash suspension is filtered to remove the ash. The sulfur in solution is crystalized by cooling and centrifugally separated from the solvent. The sulfur is dried and the remaining solvent recovered. The resultant sulfur is suitable for marketing or at this stage heated to a higher melting temperature and the liquid sulfur cast for building materials. All of the solvent from the separating and drying processes, less minimal losses, is recycled in the process. The desulfurization process is so effective that less than 0.01 percent sulfur remains in the final coal product after drying.

This process is designed to utilize standardized equipment in the various stages which can be shifted or stage rotated to maximize a uniformity of wear. The process is able to capitalize on gravity to convey materials and liquids from one stage to another wherever possible.

DETAILED DESCRIPTION OF THE PREFERRED EMBODIMENT

Figure 1:
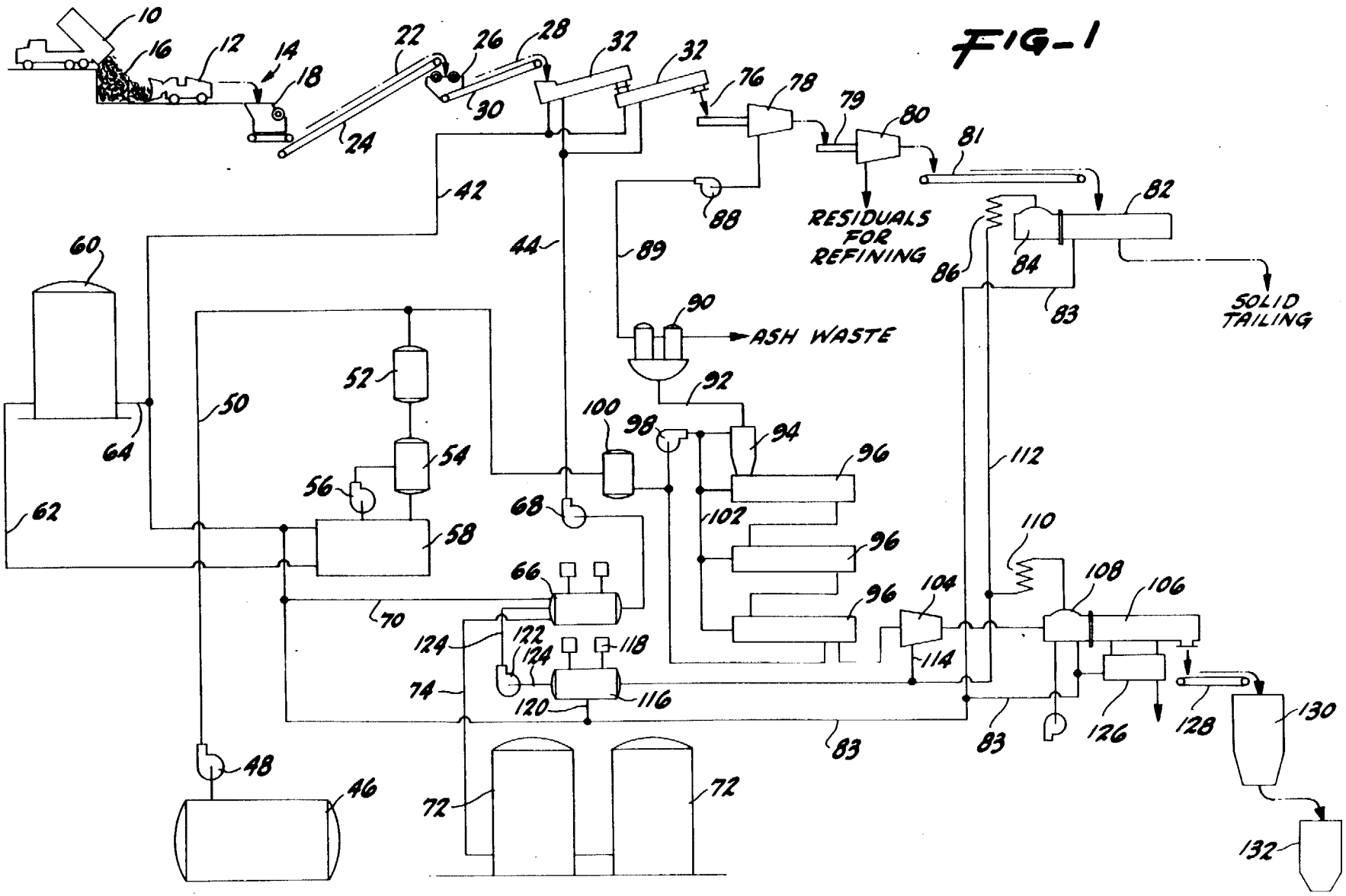
FIG. 1 is a schematic illustration of the process.

Referring to the schematic illustration of FIG. 1, the desulfurization process can be described with relation to the various circuits that make up the process when used for production of sulfur and the refining of coal for generating a coal product that is virtually sulfur-free.

The coal ore, high in impurities in bulk form is delivered by conventional handling equipment, for illustration, a dump truck 10 and front end loader 12, to an initial crushing station 14 which receives batch quantities of ore 16 in a jaw crusher 18 and by a feeder mechanism delivers aggregate size coal ore 22 in a continuous flow to a belt conveyor 24. The belt conveyor feeds the crushed coal ore 22 to a roll crusher 26 which reduces the aggregate size ore to a powder 28 of approximately 28 mesh size. A belt conveyor 30 transports the powder 28 to one or more heated mixer processors 32 into which a heated solvent is introduced. The mixer processor employed throughout this process must be continuous in nature and in certain cases must be capable of collecting products of evaporation where the processors function as dryers.

Figure 3:
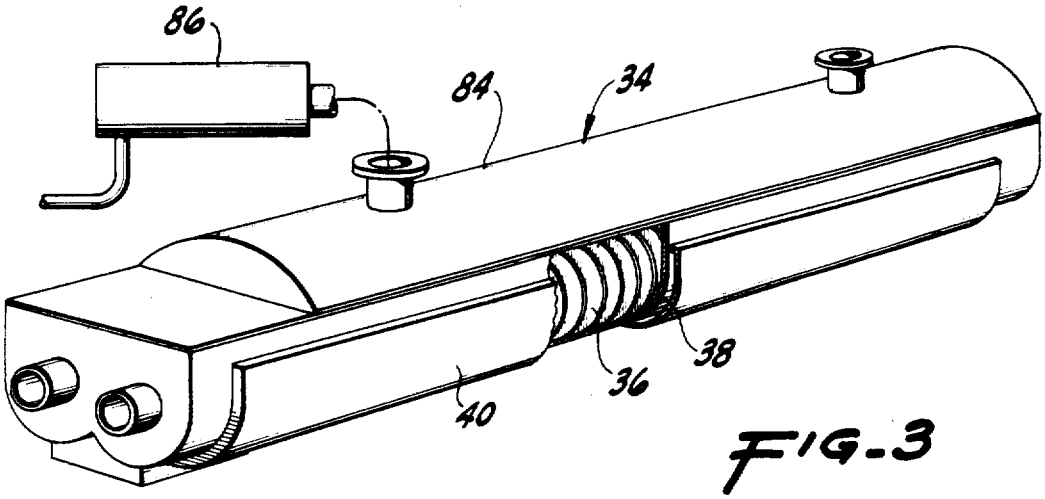
FIG. 3 is a perspective view of a processor.

While not specifically required, certain processors manufactured under the trademark Holo-Fite by Joy Manufacturing Company are suitable for multiple processing functions involved herein. These processors, an exemplar 34 of which is shown in FIG. 3, employ double conveyance screws 36 rotatable in an elongated conduit 38. The augers 36 are hollow to provide for a heat transfer fluid for cooling or heating. The conduit 38 similarly includes a fluid jacket 40 for a heat transfer fluid to provide a controllable temperature or temperature gradient in the substance processed through the processor. The fluid, a liquid or gas, is supplied to the processors from external sources. Other features of the processor are detailed hereinafter.

The mixer processors 32 as in the schematic illustration of FIG. 1 are provided with steam from a supply line 42 to achieve a mix temperature, preferably approximately 245° F. The solvent, perchlorethylene is preheated and supplied from solvent supply line 44. The mixing process leaches and dissolves sulfur into the solvent solution, forming a hot mother liquor.

The steam for heating processors 32 is obtained from water storage tank 46, where water is supplied by a pump 48 through water supply line 50 to a filter 52 to remove impurities before delivery to a recirculating tank 54. In the recirculating tank, supply water if needed is preheated by system recirculated condensation water by pump 56 before added to water in a boiler 58. The boiler is fired by fuel from a fuel supply line 62. Connected incidentally to the steam supply line 42 to the mixer processors 32 is a heating line 64 for cold climates to steam heat the storage fuel to reduce viscosity.

The solvent is supplied from a steam heated solvent supply tank 66 by pump 68. Heating of the solvent to 250° F. is accomplished by a heat exchange jacket supplied with steam from the boiler 56 through line 70. Loses, which are minimal from the closed system design, are replenished from solvent storage tanks 72 through feed line 74.

The mother liquor with coal particles and heavier undissolvable suspended and sedimentary impurities is delivered through a conduit 76 to a continuous process centrifuge separator 78. The centrifuge separator 78 separates the sulfur and solvent solution from a coal and residue slurry. The slurry is drawn off and conveyed by a screw conveyer 79 to a second centrifuge separator 80 where the lighter weight coal slurry is separated from the heavier residue or tailings. The heavier residue or tailings are in many instances suitable for refining by conventional methods to recover valuable materials, particularly rare metals. The slurry is conveyed by a conveyer 81 to a continuous process dryer 82 which comprises a similar processor to the mixer processors 32, but equipped with a domed collector 84 for recovering solvent vapors generated by evaporation during the drying process. The dryer 82 includes a steam supply line 83 for the processor's heat exchanger and a condenser 86 to condense the solvent vapors collected by the domed collector.

From the dryer, the coal is delivered in a dry powder form for further processing into briquettes and the like, bagging, or bulk shipment.

When this process is used to refine sulfur from ores other than coal, the gradient centrifuge, which has the capability of separating suspensions of different mass, is not required. A more enconomical filter drum centrifuge with internal scrapers for continuous operation may be used to separate the suspensions or tailings as an aggregate from the sulfur liquor.

The hot sulfur solution together with microparticle suspensions from the centrifuge separator 78 is pumped by pump 88 through line 89 to a pair of pre-coat filters 90 for removal of the suspensions from the sulfur solution. Depending on the quantity of suspensions the filters can be of a continuous process-type with in process scrapers or a pair of intermittent filters that are periodically scraped in alternating fashion. The ash recovered is either used in fabricating construction materials or refined by conventional methods if analysis indicates the presence of recoverable materials.

The purified sulfur solution flows through line 92 to a receiving tank 94 where cooling begins for crystalization of the sulfur in solution. The actual crystalization occurs in a set of three series arranged processors 96 which are chilled by solvent pumped by pump 98 from a heat exchanger 100 to the processors in cooling lines 102. The three crystalization processors 96 are again similar to the processor of FIG. 3, with dual screw mechanisms constructed to function as a heat exchanger using a lean solvent as the cooling medium.

By the time the sulfur solution has reached the third processor, the temperature has been reached to 80° F. and the sulfur has crystalized, existing in part as a suspension and in part as a precipitate. The crystalized sulfur and solvent solution flow to a centrifugal separator 104 where the solvent is removed, leaving crystalized sulfur. The sulfur is conveyed directly to a dryer 106 similar to the dryer 82 for the coal. The dryer is heated by a steam line 83 from the boiler to a temperature of approximately 180° F. The dryer 106 recovers and collects solvent from the sulfur crystal by the domed collector 106. The solvent vapors are condensed in condenser 110 before returning to solvent recovery line 112. Any vapors that remain are condensed when the recovery line 112 joins the solvent return line 114 from the separator 104 where relatively cool solvent is introduced in large quantities. The solvent is returned to a preheater receiving tank 116. The preheater includes one or more vapor condensers 118 which act as pressure buffers as well as condensers to reduce to liquid form any solvent vapors that may exist. To maintain a gradual increase in temperature, the receiving tank 116 is heated by steam connection line 120 which taps the steam supply line 83. The immediate maintenance and subsequent raising of the solvent temperature is necessary to prevent any further crystalization of residue sulfur dissolved in the solvent which may interfere with free flow of the solvent in the flow lines. The presence of residue sulfur is unimportant since the solvent is immediately pumped by pump 112 through feed line 124 to the main solvent heating tank 66 where it is heated to a high temperature for introduction to the first stage mixing with the crushed ore in the mixer processors 32.

The dried sulfur crystals are either fully dried in the dryer 106, which is equipped with a heat exchange unit 126, for use in a conventional commercial manner for pesticides, soil amendments, chemical manufacture, etc. Alternately, the crystals are conveyed by a conveyer 128 from the dryer 106 to a hopper 130 for mixing with a preheated aggregate in a high temperature steam heated mixer 132. In such case, the dryer need not be as thorough, and its operation is dictated by economics as to the degree of solvent recovery since the sulfur in mixer 132 is raised to the melting point 285° F. The liquid sulfur and aggregate mix are poured into suitable molds for construction materials.

Figure 4:
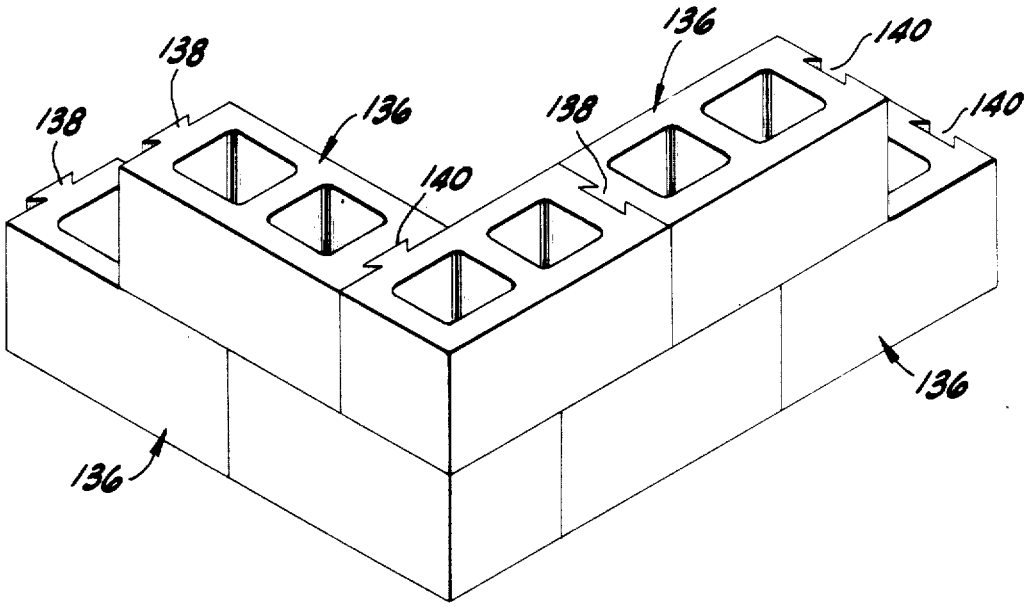
FIG. 4 is a perspective view of interlocked construction block.

For example, the molds can produce construction blocks 136 having a configuration as shown in FIG. 4. The male and female ends, 138 and 140 are easily assembled by the simple interlock of the projection and recess.

Figure 2:
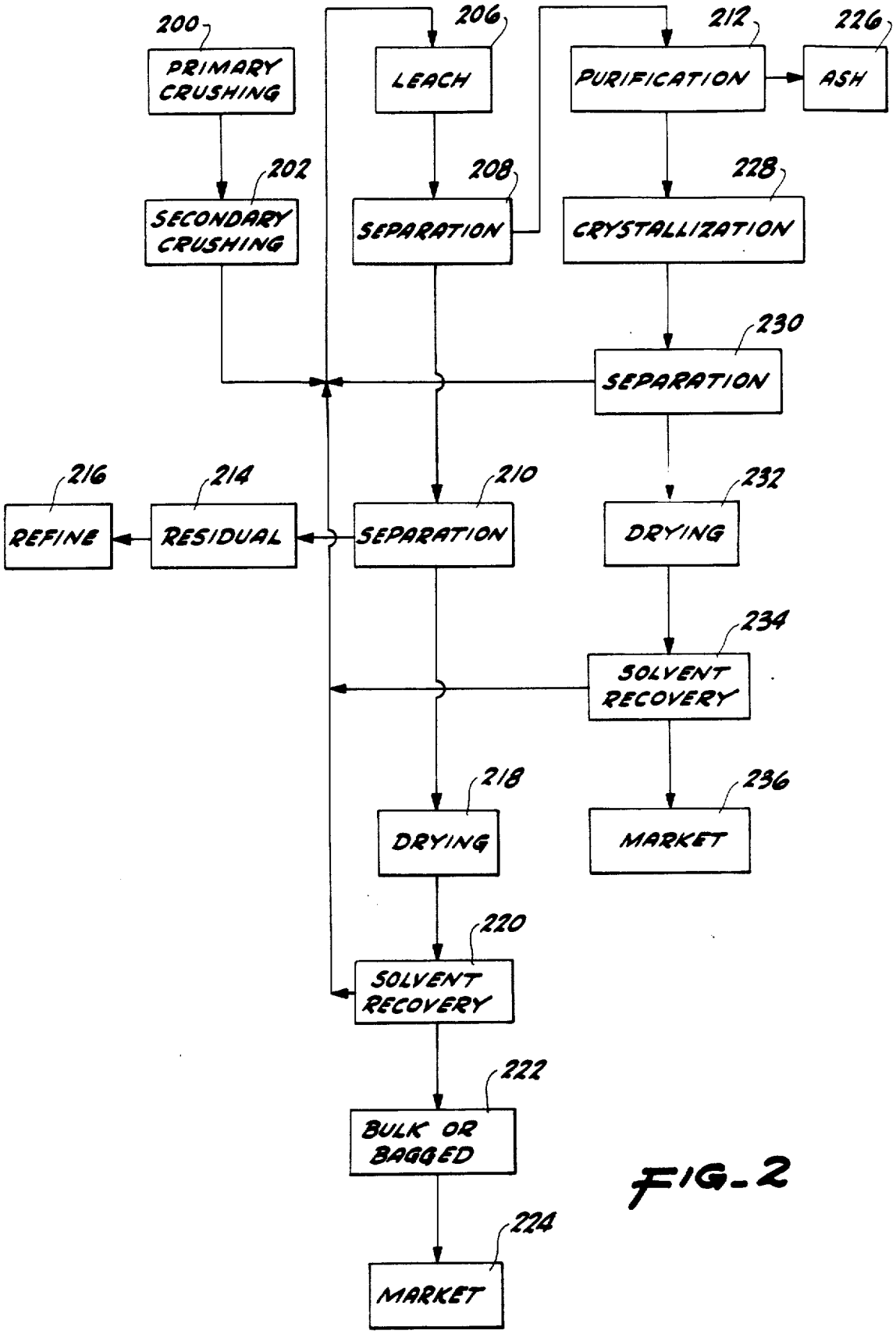
FIG. 2 is a block diagram summary of the process.

A block diagram shown in FIG. 2 provides a summary for the process. Beginning from a primary crushing stage 200, ore passes to a secondary crushing stage 202. At a juncture 204, solvent is added to the crushed ore and a leaching stage 206 is encountered where sulfur is leached into solution. Following leaching, a separation stage 208 is encountered, where a coal and residue slurry is separated in one process line and conveyed to a second separation stage 210, and a sulfur liquor is separated in another process line and conveyed to a purification stage 212.

Continuing the coal process line to completion, in the separation stage 210 a residue is separated at 214 and is discarded, used in fabrication of construction materials, or is further refined at step 216, as indicated. The coal slurry is conveyed to a drying stage 218.

Accompanying the drying stage 218 is a solvent recovery step 220 where solvent is evaporated from the slurry, condensed and returned to the solvent supply at juncture 204. The dried coal is in powder form and is processed in a bulk or bagged step 216 before a final market stage 222.

The separated sulfur liquor in the purification stage 212 removes impurities as an ash residue by filtration. The separated ash 226 may be disposed or used in fabricating construction materials.

The purified liquor enters a crystalizing stage 228 where the dissolved sulfur in solution crystalizes as a precipitate. The separation of the crystalized sulfur is accomplished in a separation stage 230 where the liquid solvent is removed, preferably by a centrifuge separator. The crystalized sulfur in a slurry is conveyed to a drying stage 232 accompanied by a solvent recovery stage 234 in which the remaining solvent is evaporated recovered and condensed and subsequently returned to the solvent supply at juncture 204. The sulfur is ready for market at final stage 236.

Since the enconomics of the system is dependent on minimizing the loss of solvent, a relatively closed cycle solvent system is virtually essential for enconomic operation of the process.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. A process for desulfurizing ores containing sulfur comprising the steps of:

a. crushing ore containing sulfur to a particle consistency;

b. feeding the crushed ore to a heated continuous-flow processor;

c. introducing pre-heated sulfur dissolving solvent into said processor with the crushed ore;

d. concurrently mixing and force conveying the crushed ore and solvent by augering in the continuous flow processor at an elevated temperature in which sulfur is dissolvable and is dissolved in a heated sulfur-solvent solution with suspended particles and a remaining ore, the processor being oriented for about horizontal augering;

e. separating the sulfur-solvent solution with suspended particles from the remaining ore at an elevated temperature;

f. drying the separated, remaining ore by evaporating remaining solvent from the ore;

g. recovering solvent from the ore drying step by condensing the evaporated solvent;

h. *in the same operative process step,* concurrently crystalizing sulfur dissolved in the sulfur-solvent solution and force conveying the sulfur-solvent solution and crystalizing sulfur by augering in a continuous flow chilled processor wherein the sulfur-solvent solution and crystalizing sulfur are conveyed together in a concurrent manner as a mixture in a continuous forward direction at controlled reduced temperatures as substantially the entire mixture progresses to a separate separating step, said crystalizing sulfur existing in part as a suspension and in part as a precipitate;

i. separating both crystalized suspension sulfur and crystalized precipitate sulfur from the solvent solution;

j. drying the separated crystalized sulfur by evaporating the solvent from the crystalized sulfur, wherein a fine crystal sulfur product is obtained;

k. recovering solvent from the crystalized sulfur drying step by condensing the evaporated solvent.

2. The process of claim 1 wherein the step of separating the sulfur-solvent solution from the remaining ore includes an added step of centrifugally separating a primary ore constituent from a secondary ore constituent, the primary ore constituent comprising the remaining ore.

3. The process of claim 2 wherein said step of separating said secondary ore constituent includes an added step of refining said secondary ore constituent for recovery of valuable materials.

4. The process of claim 2 wherein the primary ore constituent comprises coal.

5. The process of claim 1 wherein the step of separating the sulfur-solvent solution from the remaining ore at an elevated temperature is accomplished by centrifugal separation; and, the step of separating the crystalized sulfur from the solvent solution is accomplished by centrifugal separation.

6. The process of claim 1 wherein said step of crushing ore, generates a particle consistency of approximately 28 mesh wire.

7. The process of claim 1 wherein solvent comprises a perchlorethylene.

8. The process of claim 1 wherein the temperature at which the crushed ore and solvent is mixed is approximately 245° F.

9. The process of claim 8 wherein the temperature to which the sulfur dissolved in solution is reduced is approximately 80° F.

10. The process of claim 1 wherein the means for recovering solvent in said drying steps comprise a heated screw conveying processor having a domed collector with means for condensing solvent vapors to a solvent liquid associated with the collector.

11. The process of claim 1 comprising the further steps of:

a. mixing crystalized sulfur from said sulfur drying process with pre-heated aggregate using suspended particles from the filtering step in the aggregate to form a sulfur aggregate mixture;
b. heating the mixture until the sulfur melts;
c. casting the mixture in forms.

12. The process of claim 11 wherein the forms have a configuration to form construction blocks.

13. A process for desulfurizing ores containing sulfur comprising the steps of:

a. crushing ore containing sulfur to a particle consistency;
b. feeding the crushed ore to a heated continuous-flow processor;
c. introducing pre-heated sulfur dissolving solvent into said processor with the crushed ore;
d. concurrently mixing and force conveying the crushed ore and solvent at an elevated temperature in which sulfur is dissolvable and is dissolved in a heated sulfur-solvent solution with suspended particles and remaining ore;
e. separating the sulfur-solvent solution with suspended particles from the remaining ore at an elevated temperature;
f. drying the separated, remaining ore by evaporating remaining solvent from the ore;
g. recovering solvent from the ore drying step by condensing the evaporated solvent;
h. after the sulfur-solvent solution with suspended particles is separated from the remaining ore, filtering suspended particles from the sulfur-solvent solution at an elevated temperature in which sulfur remains dissolved in a sulfur-solvent solution for subsequent recovery of high grade sulfur substantially free of contaminants;
i. *in the same operative process,* concurrently crystalizing sulfur dissolved in the filtered sulfur-solvent solution and force conveying the sulfur-solvent solution and crystalizing sulfur by augering in a continuous flow chilled processor wherein the sulfur-solvent solution and crystalizing sulfur are conveyed together in a concurrent manner as a mixture in a continuous forward direction at controlled reduced temperatures as substantially the entire mixture progresses to a separate separating step, said crystalizing sulfur existing in part as a suspension and in part as a precipitate;
j. separating both crystalized suspension sulfur and crystalized precipitate sulfur from the solvent solution;
k. drying the separated crystalized sulfur by evaporating the solvent from the crystalized sulfur, wherein a fine crystal sulfur product is obtained;
l. recovering solvent from the crystalized sulfur drying step by condensing the evaporated solvent.

14. A process for desulfurizing ores containing sulfur comprising the steps of:

a. crushing ore containing sulfur to a particle consistency;
b. feeding the crushed ore to a heated continuous-flow processor;
c. introducing pre-heated sulfur dissolving solvent into said processor with the crushed ore;
d. concurrently mixing and force conveying the crushed ore and solvent by augering in the continuous flow processor at an elevated temperature in which sulfur is dissolvable and is dissolved in a heated sulfur-solvent solution with suspended particles and a remaining ore, the processor being oriented for about horizontal augering wherein the sulfur-solvent solution with suspended particles and the remaining ore are mixed and conveyed together by the processor in a continuous forward direction to a separate separating step;
e. separating the sulfur-solvent solution with suspended particles from the remaining ore at an elevated temperature;
f. drying the separated, remaining ore by evaporating remaining solvent from the ore;
g. recovering solvent from the ore drying step by condensing the evaporated solvent;
h. after the sulfur-solvent solution with suspended particles is separated from the remaining ore, filtering suspended particles from the sulfur-solvent solution at an elevated temperature in which sulfur remains dissolved in a sulfur-solvent solution for subsequent recovery of high grade sulfur substantially free of contaminants;
i. *in the same operative process step,* concurrently crystalizing sulfur dissolved in the filtered sulfur-solvent solution and force conveying the sulfur-solvent solution and crystalizing sulfur by augering in a continuous flow chilled processor wherein the sulfur-solvent solution and crystalizing sulfur are conveyed together in a concurrent manner as a mixture in a continuous forward direction at controlled reduced temperatures as substantially the entire mixture progresses to a separate separating step, said crystalizing sulfur existing in part as a suspension and in part as a precipitate;
j. separating both crystalized suspension sulfur and crystalized precipitate sulfur from the solvent solution;
k. drying the separated crystalized sulfur by evaporating the solvent from the crystalized sulfur, wherein a fine crystal sulfur product is obtained;
l. recovering solvent from the crystalized sulfur drying step by condensing the evaporated solvent.

15. The process of claim 14 wherein a single solvent composition is used in said process.

16. The process of claim 14 comprising the further step of immediately increasing the temperature of the remaining solvent solution after the step of separating the crystalized sulfur from the solvent solution.

17. The process of claim 14 wherein the step of separating the sulfur-solvent solution from the remaining ore at an elevated temperature is accomplished by centrifugal separation.

18. The process of claim 14 wherein the step of separating the crystalized sulfur from the solvent solution is accomplished by centrifugal separation.

19. The process of claim 14 having an added step of recycling recovered solvent to said mixing step.

20. A process for desulfurizing ores containing sulfur comprising the steps of:

a. crushing ore containing sulfur to a particle consistency;

b. feeding the crushed ore to a heated continuous-flow processor;

c. introducing pre-heated sulfur dissolving solvent into said processor with the crushed ore;

d. concurrently mixing and force conveying the crushed ore and solvent at an elevated temperature in which sulfur is dissolvable and is dissolved in a heated sulfur-solvent solution with suspended particles and remaining ore;

e. separating the sulfur-solvent solution with suspended particles from the remaining ore at an elevated temperature;

f. drying the separated, remaining ore by evaporating remaining solvent from the ore;

g. recovering solvent from the ore drying step by condensing the evaporated solvent;

h. *in the same operative process step,* concurrently crystalizing sulfur dissolved in the sulfur-solvent solution and force conveying the sulfur-solvent solution and crystalizing sulfur by augering in a continuous flow chilled processor wherein the sulfur-solvent solution and crystalizing sulfur are conveyed together in a concurrent manner as a mixture in a continuous forward direction at controlled reduced temperatures as substantially the entire mixture progresses to a separated separating step, said crystalizing sulfur existing in part as a suspension and in part as a precipitate;

i. separating both crystalized suspension sulfur and crystalized precipitate sulfur from the solvent solution;

j. drying the separated crystalized sulfur by evaporating the solvent from the crystalized sulfur, wherein a fine crystal sulfur product is obtained;

k. recovering solvent from the crystalized sulfur drying step by condensing the evaporated solvent.

21. The process of claim 20 comprising the further step of immediately increasing the temperature of the remaining solvent solution after the step of separating the crystalized sulfur from the solvent solution.

22. The process of claim 20 wherein the step of separating the sulfur-solvent solution from the remaining ore at an elevated temperature is accomplished by centrifugal separation.

23. The process of claim 20 wherein the step of separating the crystalized sulfur from the solvent solution is accomplished by centrifugal separation.

24. The process of claim 13 comprising the further step of immediately increasing the temperature of the remaining solvent solution after the step of separating the crystalized sulfur from the solvent solution.

25. The process of claim 13 wherein the step of separating the sulfur-solvent solution from the remaining ore at an elevated temperature is accomplished by centrifugal separation.

26. The process of claim 13 wherein the step of separating the crystalized sulfur from the solvent solution is accomplished by centrifugal separation.

* * * * *